Oct. 29, 1968  C. O. FINN  3,407,432
DEBRIS COLLECTOR
Filed Sept. 27, 1965  2 Sheets-Sheet 1
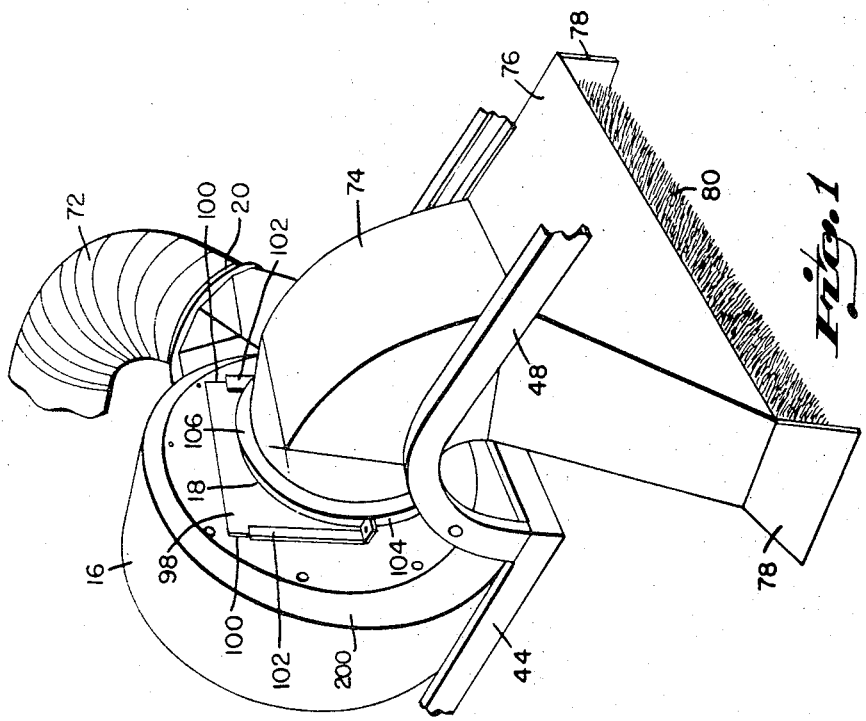
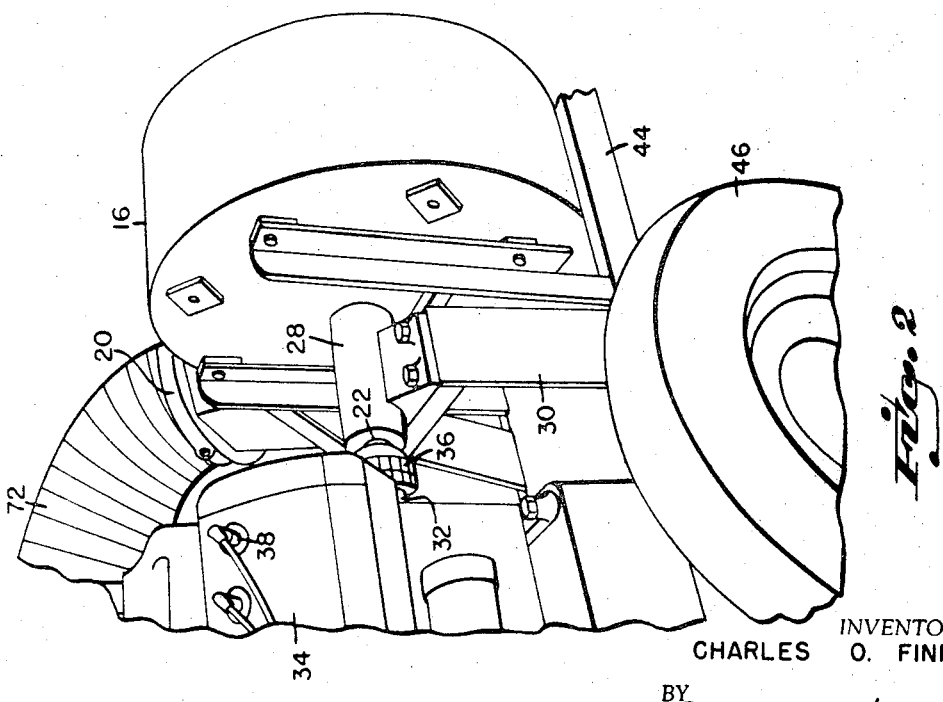
INVENTOR.
CHARLES O. FINN
BY
*J. Warren Kinney, Jr.*
ATTORNEY

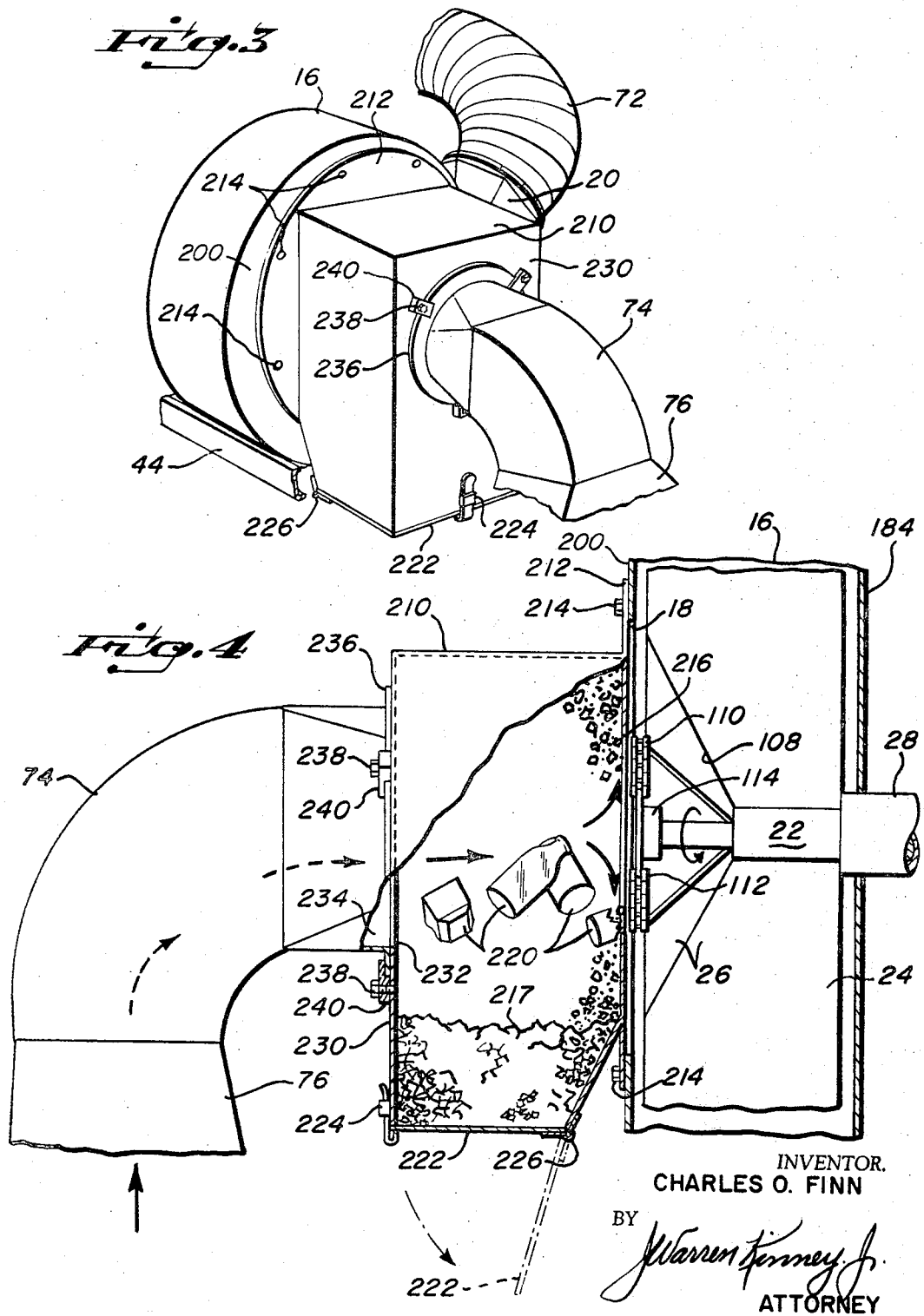

United States Patent Office 3,407,432
Patented Oct. 29, 1968

3,407,432
DEBRIS COLLECTOR
Charles O. Finn, Cincinnati, Ohio, assignor to The Finn Equipment Company, Cincinnati, Ohio, a corporation of Ohio
Filed Sept. 27, 1965, Ser. No. 490,388
3 Claims. (Cl. 15—352)

ABSTRACT OF THE DISCLOSURE

The debris collector is operated with suction force powerful to the extent that it may pick up stones, cans, bottles, cardboard cartons, pieces of wood, and other heavy objects in addition to tree leaves, paper, and other lighter-weight trash. A drop-box or collector of heavy articles is quick-detachably interposed between the pick-up nozzle and the suction fan, and on the suction fan drive shaft is mounted a flexible beater chain located ahead of the fan or impeller, to disintegrate stones, cans bottles and other heavy objects before they can reach the fan or impeller blades and enter the fan housing. The flexible beater chain is thrown outwardly by centrifugal force as the fan drive shaft rotates, and intercepts heavy objects at the fan intake port, to deflect such objects into the collector or drop box. Quick-detachable connections provide for use of the apparatus with the collector or drop-box removed, if desired.

---

This invention relates to a debris collector, and in particular to a debris collector in the form of an attachment of the multi-purpose device disclosed in my copending application Ser. No. 346,960 filed Feb. 24, 1964, and issued Mar. 22, 1966 as Patent No. 3,241,173.

The multi-purpose device of my aforesaid copending application was adapted for use in seeding, fertilizing, treating and otherwise maintaining lawns or other grass areas, including keeping such areas free of debris, litter or the like.

The aforesaid multi-purpose device was adapted to be towed or otherwise moved onto or over an area to be serviced, and said device was constructed in such a manner as to be quickly and easily converted for the performance of various types of services required for the proper care of extensive grass areas, lawns and the like during all seasons of the year. The multi-purpose device of my aforesaid patent included a vehicle or machine which utilized a current of high velocity, high volume air in performing the various services required.

A primary object of the present invention is to provide a service vehicle of the character stated, with a simple and easily interchangeable attachment for collecting heavy or bulky objects of debris and separating same from other debris which is more easily disposed of.

The foregoing and other objects are attained by the means described herein and illustrated upon the accompanying drawings, in which:

FIG. 1 is a perspective view showing part of a tractional vehicle carrying a vacuum sweeper and blower, for picking up debris and the like from the ground.

FIG. 2 is a perspective view showing the vehicle and the rear portion of the blower.

FIG. 3 is a perspective view showing a modification of FIG. 1, to incorporate the present invention.

FIG. 4 is a side elevation of FIG. 3, showing some of the components in cross-section.

The device of the present disclosure, like the device of my issued patent above noted, is for the use of attendants whose duties involve caring for parks, lawn areas, roadway medians and other areas of considerable size, which usually are to be maintained and serviced in the interests of beauty and safety. Part of the service involves the suction-lifting and disposal of debris, which may include not only grass-cuttings, leaves, paper and the like, but also, heavy articles such as bottles, cans, bulky cartons, and similar articles which desrably may be separated from the lighter materials collected, and shunted from the impeller of the suction generator whenever possible.

In the accompanying drawings, 16 indicates a blower housing having an air intake port 18, and a discharge port tangent to the housing perimeter for directing air and debris to and through an attached conduit 72. The conduit 72 may convey debris to a receptacle, or to a location remote from the area undergoing clearing, as may be desired. In a typical arrangement, discharge conduit 72 may be a flexible pipe delivering exhaust materials to a screened cage (not shown), which may be carried by the vehicle frame extension 48, or by another vehicle for collecting debris.

In the arrangement of FIG. 1, a detachable suction hood 74 is applied over the intake port of the blower, the hood having a wide suction head 76 to closely approach the ground for picking up debris and directing it toward blower housing 16. Head 76 may carry depending end walls 78, 78 which if desired, may support a horizontal broom 80 to sweep the ground.

The broom 80 may be of a type which is rotatable, if desired, and may be driven in any suitable manner, or by the means detailed in my previous disclosure.

Reverting to FIGS. 2 and 4, a shaft 22 is arranged transversely of housing 16, and carries a rotor or impeller 24 which includes a plurality of radial blades 26 to move a high-volume current of air into the intake port 18, for delivery through discharge conduit 72. The impeller is disposed off-center within housing 16, as is usual in blowers of the type disclosed, and may be supported for rotation in a bearing 28 secured to a fixed standard 30.

The impeller shaft 22 of the blower may be driven by the drive shaft 32 of a motor 34, through the intermediary of a coupling unit 36. The motor as herein disclosed by way of example, may be an internal combustion engine. The engine may be supported upon the main frame or chassis 44 of a trailer vehicle having a pair of wheels 46.

A quick-detachable connection may be provided for mounting the suction hood upon blower housing 16. In FIG. 1, this is shown as a flat rectangular adapter plate 98 secured to the upper end of hood 74 transversely thereof, said plate having upright side edge margins 100 slidably received in channeled parallel guides 102 fixed upon a face plate 200 of housing 16. Hood 74 may be quickly detached from plate 200 for exposing intake port 18, by simply lifting it bodily upwardly to slide the adapter plate 98 from the upper ends of the guides.

The sweeper attachment of FIG. 1 may quite often pick up and deliver to the blower housing, various objects such as cans, bottles, blocks of wood, or other articles capable of damaging the blades of impeller 24. To minimize such damage, the impeller blades may be cut away along an oblique line as indicated at 108, FIG. 4, and ahead of the blades may be located a plurality of flexible chain sections 110 to strike and throw outwardly such objects as may enter the intake port, before the objects can be struck by the impeller blades.

The flexible sections 110 may have inner ends mounted at 112 upon a disc 114 secured to the forward end of impeller shaft 22, in advance of the blade edges 108, so that any object of the kind mentioned above may be struck by the chains, and possibly fragmented or crushed thereby, in advance of being centrifuged past the impeller. By this means the impeller is protected against possible damage.

It must be understood that the chain sections 110, being articulated, are limp, and will not be radially extended unless the impeller shaft is in rapid rotation. For further details as to this, reference may be had to my previous disclosure hereinbefore identified.

With reference now to FIGS. 3 and 4, the reference numeral 210 indicates a hollow box-like attachment to be interposed between blower housing 16 and suction hood 74, for collecting bulky or relatively heavy articles of junk before such articles are sucked into the blower housing. The attachment 210 may be referred to as a junk trap or collector of heavier debris.

As FIG. 4 clearly shows, the box-like structure 210 may carry a fixed circular mounting flange 212, to cover the air intake port 18 of blower housing 16, the structure 210 being removably secured to the housing by means of screws 214. Flange 212 is of generally flat formation and forms the back of box 210, leaving a substantially central opening 216 which in effect, constricts the size of blower housing intake port 18. The diameter of opening 216 may approximate the diameter of a circle described by beater chains 110 when the blower is operating. Thus, the inner portion of flange 212 provides a rear wall interiorly of box 210, serving as a limited baffle area to intercept objects 220 drawn into the box through suction head 76 and hood 74.

It is noteworthy that the chain sections or beaters 110 preferably rotate in a plane which is parallel to and substantially within the plane of blower housing inlet port 18, so that in consequence, the chain sections move very close to the constricted opening 216 of flange 212. The effect of rotating the chain sections in very close proximity to the box opening 216, is to knock down the airborne articles 220 before they enter the blower housing 16, and so deflect the articles or the majority of them to the sump or well 217 of the collector box or junk trap 210, FIG. 4.

The bottom of the box or trap 210 may include a releasable door 222, held normally closed by a latch 224 accessible to an attendant who may at proper times release the latch and empty the box of trash when required. The door 222 may be of any suitable type, although in the example shown it is hinged to box 210 at 226.

The forward wall 230 of box 210 is provided with an aperture 232 which is dimensioned to register with the mouth 234 of suction hood 74. A circumferential flange 236 defining mouth 234 abuts the forward wall 230 of box 210, and may be detachably secured thereon by means of bolts 238 passing through the mounting lugs 240. The mounting lugs 240, their bolts 238, and the series of bolts 214, furnish a ready means for insertion or removal of trash box 210, between the blower and the suction head of the apparatus, as may be desired.

It should be understood that attaching means for the suction head 74 upon box 210, may take the form set forth in my previous disclosure, and the quick-detachable connection at 100 of FIG. 1 may be preferred for mounting the box 210 upon blower housing 16. The improvement presently disclosed is applicable to the earlier disclosed device.

It is to be understood that various modifications and changes may be made in the structural details of the present device, within the scope of the appended claims, without departing from the spirit of the invention.

What is claimed is:

1. A multi-purpose service apparatus for preparing and maintaining lawn areas, comprising in combination: a vehicle including a tractional elongate frame, a blower on the frame including a substantially cylindrical drum-like hollow housing having a rear wall, a front wall apertured to provide a port for air intake, and a side wall having a port for air discharge, a motor-driven impeller shaft including an impeller within the housing for moving a current of air through said ports, suction sweeper means activated by said blower for suction-lifting loose debris from the lawn area, said sweeper means including a suction hood having an open mouth directed toward the air intake port of the blower housing, a hollow rectangular box-like collector of heavy junk articles, said collector having an apertured rear wall, an apertured front wall, and a sump intermediate said walls, means detachably securing the front wall of the collector to the suction hood, with the mouth of the hood in register with the front wall aperture of the collector, means detachably securing the rear wall of the collector to the blower housing, with the aperture of said collector rear wall in register with the air intake port of the blower housing, and a flexible beater means fixed on the impeller shaft to rotate therewith, the beater means being located in substantially the plane of the air intake port of the blower housing, the said aperture of the rear wall of the box-like collector being approximately the diameter of a circle described by said beater means when the blower is operating whereby the beater means strike and deflect junk articles in motion approaching the impeller, and induce gravitation of such articles to said sump.

2. The device as set forth in claim 1, wherein the beater means comprises flexible chains which extend radially outward from the rotating shaft by the action of centrifugal force.

3. The device as set forth in claim 1, wherein the sump portion of the collector box is provided with a displaceable bottom closure.

References Cited

UNITED STATES PATENTS

| 1,672,001 | 6/1928 | Serva et al. | 15—347 X |
| 3,163,471 | 12/1964 | Williams | 302—37 |
| 3,241,173 | 3/1966 | Finn. | |
| 3,300,807 | 1/1967 | Berkowitz | 15—340 |

FOREIGN PATENTS

| 187,843 | 7/1907 | Germany. |

ROBERT W. MICHELL, *Primary Examiner.*